United States Patent
Hull et al.

[11] Patent Number: 5,806,816
[45] Date of Patent: Sep. 15, 1998

[54] FASTENER INCLUDING A FLEXIBLE STRAP AND SUCTION CUP

[76] Inventors: Harold L. Hull, 401 Canyon Way #43, Sparks, Nev. 89434; Dan E. Harmer, 864 E. Second St., Reno, Nev. 89502; James W. Dobney, 447 Ridgeway, Ontario, Oreg. 97914; Cathy D. Santa Cruz, 401 Canyon Way #43, Sparks, Nev. 89434, trustee of said Harold L. Hull, deceased

[21] Appl. No.: 673,515

[22] Filed: Jul. 1, 1996

[51] Int. Cl.[6] .............................. A45D 42/14; B60J 7/20; A47B 97/02
[52] U.S. Cl. .................. 248/205.6; 224/568; 248/206.3; 248/503
[58] Field of Search ............................. 248/205.5, 205.6, 248/206.3, 500, 503, 505; 224/318, 568

[56] References Cited

U.S. PATENT DOCUMENTS

| | | | |
|---|---|---|---|
| 2,139,849 | 12/1938 | Powers | 248/205.5 |
| 2,302,300 | 11/1942 | Davies | 224/568 X |
| 2,315,387 | 3/1943 | Bambenek et al. | 248/206.3 X |
| 2,502,714 | 4/1950 | Garnett | 248/505 X |
| 2,908,522 | 10/1959 | Glave | 248/503 X |
| 2,983,413 | 5/1961 | Verwers | 224/318 |
| 4,108,342 | 8/1978 | Riva | 224/318 X |
| 4,655,376 | 4/1987 | Darling | 248/503 X |
| 4,666,194 | 5/1987 | Charman . | |
| 5,362,270 | 11/1994 | Hansen et al. . | |
| 5,386,960 | 2/1995 | O'Brien | 248/205.5 |
| 5,390,837 | 2/1995 | Ruffolo | 224/482 |
| 5,429,335 | 7/1995 | Cunningham | 248/229.1 |
| 5,481,764 | 1/1996 | Nelson . | |
| 5,481,765 | 1/1996 | Wang . | |

FOREIGN PATENT DOCUMENTS

| | | | |
|---|---|---|---|
| 978317 | 4/1951 | France | 224/318 |
| 1045085 | 11/1953 | France | 224/318 |

*Primary Examiner*—Daniel P. Stodola
*Assistant Examiner*—Gregory J. Strimby

[57] ABSTRACT

A multi-purpose fastener which may be used to adjustably, removably secure an object of choice to a smooth surface of choice, with the fastener comprising a flexible strap, a suction cup, locking member, and a slidable keeper. Also, the fastener is functional by itself, and/or if preferred, multiple fasteners may be interconnected in combination for various uses of choice.

1 Claim, 2 Drawing Sheets

FASTENER INCLUDING A FLEXIBLE STRAP AND SUCTION CUP

FIELD OF THE INVENTION

The present invention relates to multi-purpose fasteners, but more particularly relates to a fastener used to removably attach an object of choice to a smooth surface with the fastener providing in combination, a flexible strap, a suction cup, a slidable locking member, a keeper and stop means.

BACKGROUND OF THE INVENTION

Multi-purpose fasteners are numerous and well known in the prior art, but it is contended by the applicants that not all such fasteners are functional for removably attaching an object of choice to substantially any smooth surface of choice, such as to window glass, a table top, a wall, etc., as most fasteners include hooks, clasps, rings, etc., and each of which are not mountable to a smooth surface. Therefore, the present invention relates more closely to fasteners having a flexible strap attached to a suction cup, or the like, which is removably attachable to substantially any smooth surface of choice.

In the past, various devices and apparatuses have been taught which include in combination a suction cup (or multiple suction cups) and a strap, such as the following U.S. Pat. No. 5,481,764, entitled "UNDERWATER SEAT RESTRAINT APPARATUS", U.S. Pat. No. 5,429,335, entitled "ARTICLE-HOLDING STRAP ASSEMBLY FOR AUTOMOBILE SUN VISOR", U.S. Pat. No. 5,362,270, entitled "SURFBOARD LEASH RETAINER" and U.S. Pat. No. 4,666,194, entitled "TRUNK LID FASTENING DEVICE FOR AUTOMOBILES". However, each of these references are not considered to be a multi-purpose fastener, as each reference is designed for a specific function and none of the references suggest and/or imply that they could be used as a multi-purpose fastener.

It is therefore contended by the applicants that there is a great need for a multi-purpose fastener which is removably attachable to substantially any smooth surface of choice and which further holds substantially any object of choice in a secure manner against the smooth surface thereof, such as taught by the present invention. It is to be noted that nowhere in the prior art did the applicants find a fastener constructed as the present fastener and nowhere in the prior art did the applicants find a fastener which provides the unexpected results and the unique advantages as taught by the present invention.

SUMMARY OF THE INVENTION

The present invention is substantially a multi-purpose fastener which may be formed from pre-existing parts, and which when combined provides a unique fastener for removably attaching substantially any object of choice to substantially any suitable smooth surface of choice.

Therefore, it is an object of the present invention to provide a multi-purpose fastener which is removably attachable to substantially any smooth surface of choice.

It is a further object of the present invention to provide a multi-purpose fastener which may be used to removably attach in a secure manner substantially any object of choice to substantially any smooth surface of choice.

Another object of the present invention is to provide a multi-purpose fastener comprising in combination a flexible strap, a suction cup, a slidable adjustable locking member, a keeper and stop means.

A further object of the present invention is to provide a multi-purpose fastener which is functional and complete as one unit, or if preferred, multiple fasteners may used and attached in combination.

Still another object of the present invention is to provide a multi-purpose fastener which provides new and unusual results heretofore not seen nor taught.

Yet a further object of the present invention is to provide a multi-purpose fastener which may be produced in various sizes and in various colors of choice.

Also, a further object of the present invention is to provide a multi-purpose fastener which is most economical to manufacture and which is easily marketable.

Other objects and advantages will be seen when taken into consideration with the following specification and drawings.

DETAILED DESCRIPTION OF THE DRAWINGS

Figure 1:
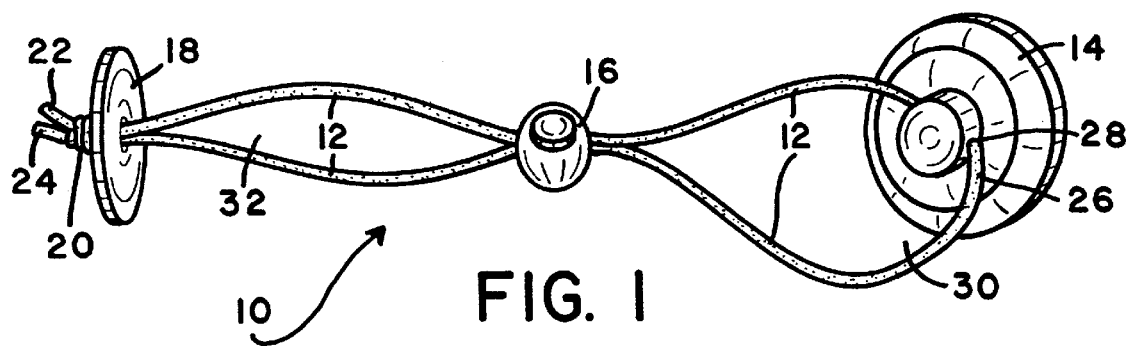
FIG. 1 is substantially a perspective view of the present invention.

Referring now in detail to the drawings wherein like numerals refer to like elements throughout the various drawings, arrow (10) as shown in FIG. 1, represents an over view of the present invention which is substantially a multi-purpose fastener which may be used to secure substantially any object of choice to a smooth surface.

Fastener (10) comprising in combination, a flexible strap (12) which is made from any suitable material of choice, such as rubber, elastic, stretchable plastic, etc. and which is of a size and shape of engineering choice, a suction cup (14) which is removably attachable by suction to a smooth surface of choice and which is of a size and shape of engineering choice, such as the suction cup which is manufactured and marketed by Adems Manufacturing, 109 West Park Rd, Porterville, Pa. 16051, a slidable locking member (16) which is of a size and shape of engineering choice, such as the "Orb-lock" as manufactured and marketed by Duraflex Co., a slidable keeper (18) which is of a shape and size of engineering choice and which is made from substantially any material of choice, such as rubber, leather, plastic, etc., and a stop means which may be any suitable stop means of engineering choice, such as a knot (20), or the like.

Strap (12) is shown having a first end (22), a second end (24) and substantially a center section (26), with the first end (22) being threadably inserted into and pulled through an aperture (28) (which is formed within the suction cup 14) until the center section (26) is positioned within the aperture (28), respectively, with the first end (22) and the second end (24) each being threadably slidably inserted into and through the slidable locking member (16), thus forming a first loop (30), with the first end (22) and the second end (24) each being threadably slidably inserted into and through the slidable keeper (18), thus forming a second loop (32), (see FIG. 1), and the first end (22) and the second end (24) being fixedly attached together by the stop means, and/or knot (20).

Figure 3:
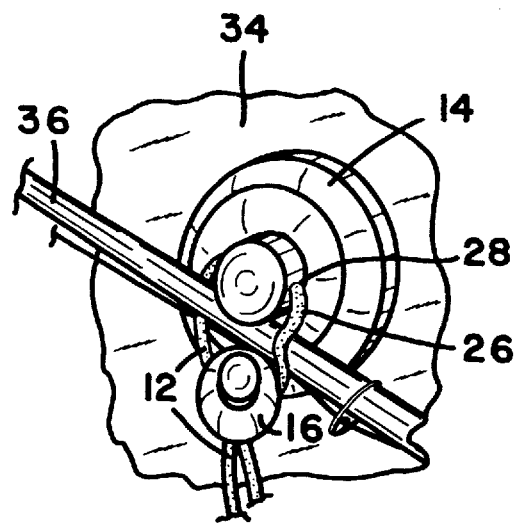
FIG. 3 is substantially a perspective view of the present invention when used as a fishing rod holder.

It will now be seen that when the suction cup (14) is positioned and pressed upon a smooth surface (34) (such as the glass surface of a window pane) and an object (36) (such as the fishing rod of FIG. 3) is positioned within the first loop (30), and the slidable locking member (16) is slidably adjusted so as to cause the first loop (30) to become taut and capture the object (36) within the first loop (30) in a removably yet secure manner, and the locking member (16) is locked into place, the fastener (10) in combination with the smooth surface (34) cooperate together to removably attach the object (36) to the smooth surface (34) in a secure manner, as clearly shown in FIG. 3. It is to be noted that FIG. 3 is exemplary of one possible use for the present fastener, when the fastener is used as a fishing pole holder, and we provide a method of use which includes the following steps;

a. grasping the fastener (10);
 b. positioning and pressing the cup (14) against a smooth surface (34);
 c. inserting the object (36) into the loop (30);
 d. adjustably sliding the locking member (16) until the loop (30) captures the object (36) therein in a secure manner; and
 e. locking the member (16) into place.

Figure 2:
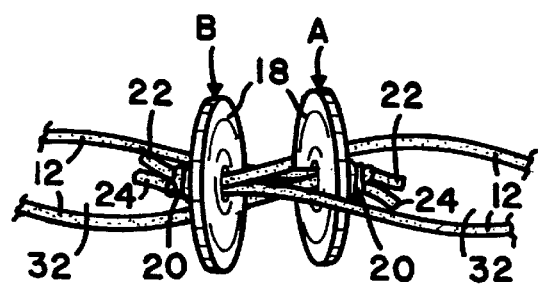
FIG. 2 is substantially a perspective view showing two keepers when attached to each other.

Referring now to FIG. 2 wherein we show a first and a second fastener, (A) & (B), which in combination cooperate together to removably attach an object of choice to the smooth surface (not shown) in a secure manner, with the first and second fastener each comprising in combination each of the afore mentioned elements, namely; strap (12), suction cup (14), locking member (16), keeper (18), and stop means, such as knot (20), and each of the first and second fasteners being constructed, as previously described.

Whereby, when the cup (14) of the first fastener (A) is positioned and pressed against a smooth surface (not shown in FIG. 2), and the cup (14) of the second fastener (B) is positioned distally away from the cup (14) of the first fastener (A) and pressed against a smooth surface, and the object of choice is positioned substantially between the cup (14) of the first fastener (A) and the cup (14) of the second fastener (B), and the keeper (18) of the first fastener (A) is inserted into and through the second loop (32) on the second fastener (B), and when tension is applied thereto, the keeper of the first fastener (A) and the keeper of the second fastener (B) cooperate together in a tensioned manner to removably attach the object to the surface in a secure manner.

Figure 4:
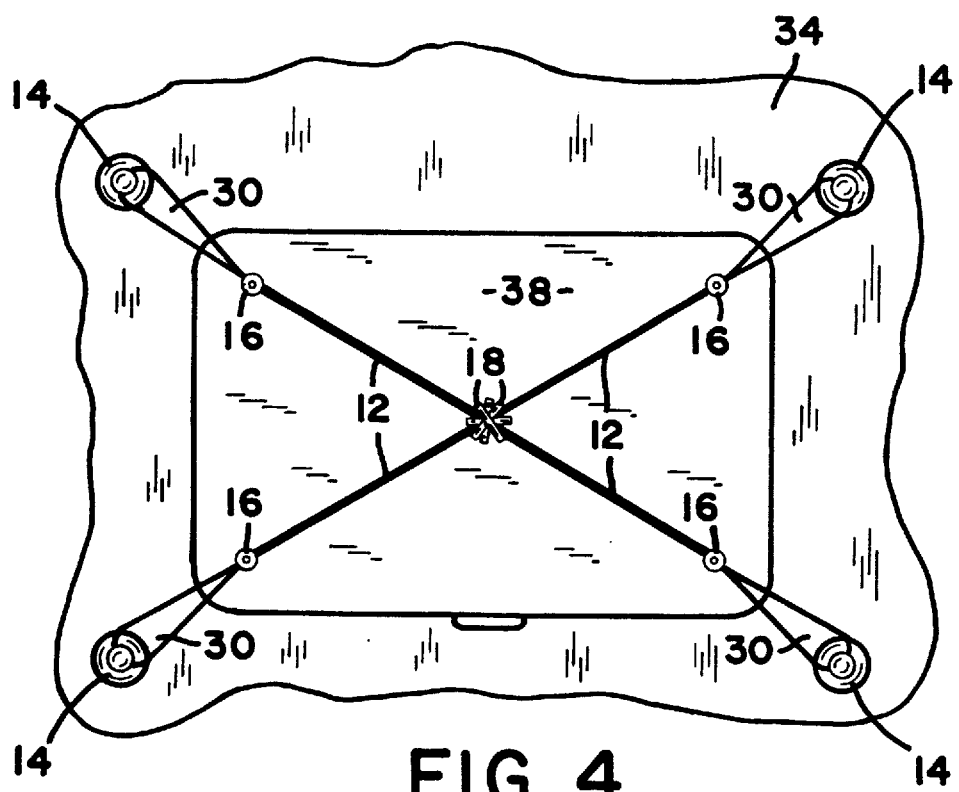
FIG. 4 is substantially a top view of the present invention when used as a luggage support device.

Referring now to FIG. 4, which is exemplary of another use for the present fastener wherein we show multiple fasteners being interconnected in combination in such a manner as to adjustably removably secure an object of choice, such as a suitcase (38), to a smooth surface of choice, such as a vehicle roof top (34). As clearly shown therein, suitcase (38) is positioned at a location of choice upon the roof top (34) with each suction cup (14) of each of four fasteners being positioned upon the roof top (34) at a location of choice, with each strap (12) of each fastener being tensioned with each keeper (18) of each strap (12) being removably attached together as previously described, thus, each of the multiple fasteners when used in combination cooperate together to secure the suitcase (38) to the roof top (34) in an adjustable, removable manner.

It will now be seen that we have herein provided a unique fastener which provides unusual results and can be used to removably adjustably secure substantially any object of choice to a smooth surface of choice.

It will also be seen that we have herein provided a fastener which is functional by itself and/or multiple fasteners may be connected in numerous combinations for various uses of choice.

It will further be seen that we have herein provided a fastener which may be produced and manufactured from pre-existing parts, but such a unique combination has not heretofore been taught and the advantageous qualities and unusual results obtained from such a combination has heretofore not been recognized and or achieved.

It will also be seen that we have herein provided a fastener which is most economical to manufacture and which is very marketable.

Although the invention has been herein shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatuses.

Having described our invention, what we claim as new and wish to secure by a Letters Patent is:

1. A fastener arrangement for securing an object to a surface, said fastener arrangement comprising:

a plurality fasteners;
 each said fastener comprising, a flexible strap; a suction cup; a slidable locking member; and a slidable keeper; said strap having a first end, a second end and substantially a center section, said first end being threadably inserted into and pulled through an aperture formed within said cup until said center section is positioned within said aperture, said first and said second end each being threadably slidably inserted into and through said slidable locking member, thus said strap is formed into a first loop between said slidable locking member and said cup, said first and said second end each being threadably slidably inserted into and through said slidable keeper, thus said strap is formed into a second loop between said slidable locking member and said slidable keeper, and said first and said second end being fixedly attached together;
 said slidable keeper of each said fastener being inserted into the second loop of the other said fasteners;
 whereby, said fastener arrangement is positionable around the object and said suction cups are adapted to engage the surface to secure the object between said straps and the surface.

* * * * *